United States Patent Office 2,757,163
Patented July 31, 1956

2,757,163

STABILIZATION OF CHLOROSULPHONATED POLYMERS BY MEANS OF SALICYLALAZINE

George Henry Bowers III, Wilmington, Del., assignor to E. I. du Pont de Nemours and Company, Wilmington, Del., a corporation of Delaware No Drawing. Application June 4, 1953,
Serial No. 359,654

5 Claims. (Cl. 260—45.9)

This invention relates to the stabilization of chlorosulphonated polymers, and more especially to the stabilization of chlorosulphonated polymers of the class consisting of polymethylene, polyethylene, and interpolymers of ethylene and vinyl chloride so as to improve their resistance to the action of heat and light after vulcanizing.

Chlorosulphonated polymers may be prepared in several ways, notably by the process of the McQueen patent, U. S. 2,212,786. Substances of this sort, having molecular weights of about 5000 or more, exhibit elastomeric characteristics. Their properties may be enhanced by "curing" or "vulcanizing" the raw polymer, somewhat after the manner in which natural rubber is vulcanized, by treatment with suitable curing agents such as, for example, those disclosed in the McAlevy et al., U. S. Patents 2,416,060 and 2,416,061. These cured products are finding increasing use in a variety of useful applications by virtue of the particular suitability of their unique combination of desirable properties such as strength, resilience, chemical resistance, ozone resistance, etc. In common with many other polymeric materials, however, cured chlorosulphonated polymers have a tendency to undergo change under the influence of continued exposure to heat and light, such change being manifested particularly in the stress-strain properties of the polymers. While the heat and light stabilities of unstabilized chlorosulphonated polymers are adequate for many applications, there are some existing uses in which an increased degree of stability is desirable, and other potential uses to which it may be essential, these comprising in general any use wherein conditions of exposure to heat and light are likely to be severe.

Stabilizing organic plastic or elastomeric compositions by the addition of appropriate stabilizers is old. However, the nature of the action of such stabilizers is not well understood, and in the present state of the art, it is impossible to predict what effect any particular stabilizer will show with a particular plastic or elastomeric substance. The situation is closely analogous to that encountered in the development of catalysts for chemical reactions, and is, in fact, a situation which for resolution requires the discovery of an anti-catalyst suitable to the special environment where it is to act. For example, numerous stabilizers such as dibasic lead phthalate, barium ricinoleate, cadmium stearate, and phenyl salicylate, have been developed for use with chlorinated polymers, but have been found entirely inadequate for the stabilization of chlorosulphonated polymers. Aside from differences in the physical character of the materials, there are distinct differences in the reactions which need to be suppressed in order to bring about stability. Thus, one of the reactions through which chlorosulphonated polymers may deteriorate is via the hydrolysis of an SOOCl group, and that fact renders the problem distinctly different from the stabilization of chlorinated hydrocarbons, in which the stability of SOOCl groups is not involved.

It is an object of the present invention to provide new compositions of matter comprising chlorosulphonated polymers and a stabilizer therefor. Another object is to provide a method of stabilizing chlorosulphonated polymers. Other objects will appear hereinafter.

According to the present invention it has been found that these and other objects may be accomplished by incorporating into the polymer a minor amount of salicylalazine. Such incorporation may conveniently be carried out by milling the stabilizer into the uncured polymer, although the precise manner in which the incorporation is performed is not critical for the purposes of this invention so long as a reasonably uniform distribution of the salicylalazine within the polymer mass is effected prior to final cure.

The salicylalazine employed in the practice of this invention is also sometimes known as salicylaldazine. It is normally a solid, melting in the pure state at about 213° C., and may readily be prepared in a variety of ways well known in the art, as, for example, by the action of salicylaldehyde on hydrazine hydrate in alcoholic solution.

The invention is more specifically described and illustrated by means of the following tables and explanatory paragraphs, which, however, are intended solely to exemplify and not to limit the scope of this invention.

Table I sets forth the composition of several test batches of chlorosulphonated polythene. As a first step in making up these compositions, four "master" batches of elastomeric uncured chlorosulphonated polyethylene were prepared. In this first step, a supply of typical, commercially available raw polymer was fed to the rolls of a conventional water-cooled, two-roll mill of a type commonly used in the compounding of rubber, the rolls being of metal and about 6 inches in diameter, operated at a front roll speed of about 18 R. P. M. and a back roll speed of about 24 R. P. M. so as to provide a friction ratio of about 1.33. The stock was banded for from one to three minutes until a smooth surface and an even bank appeared. Various ingredients representative of the type commonly used in such practice were then added and worked into the mass, addition generally being in the following order: (1) plasticizer, (2) curing agent, (3) filler, and (4) accelerator. Compounding was continued via conventional rubber procedure, usually for a total time of about 20 minutes until all ingredients were thoroughly blended. The batch was then sheeted off the rolls and set aside. Portions of each of these master batches were cured and used as controls in subsequent stabilizer evaluation tests. Other portions were further compounded and thoroughly blended with the desired amount of finely-divided salicylalazine, generally on a smaller mill having two two-inch diameter metal rolls, each running at the same speed.

Test samples from each of the above compositions were cured via compression molding at about 550 p. s. i. and 140°–150° C., using a cure time of approximately 30 minutes. The mold cavities were built up using conventional press-polish plates with appropriate metal spacers. The cavities were lined with aluminum foil coated with a mold-release agent so as to facilitate removing the molded sheet after cure. Press equipment was a laboratory model steam-heated Preco press.

Samples of each of the cured sheets were set aside as controls. Other samples were subjected to rigorous exposure to heat and light under standardized conditions. Finally, standardized tests of stress-strain properties were made on each of the test samples so as to provide comparative data on the initial and final characteritics of both stabilized and unstabilized material.

Heat stability data were obtained on samples exposed to a temperature of 125° C. in a Precision Scientific Co. circulating air oven. Specimens cut from the cured sheets, with die "C" of ASTM D-412-41, were hung within the oven in a manner similar to that specified in ASTM D-573-48, and removed after seven days, then allowed to cool for not less than about two hours before being tested. Light stability data were obtained on similarly prepared specimens either exposed for 500 hours in a "Weatherometer" in accordance with ASTM D-750-43T or exposed seven days to intensive ultraviolet light. The "Weatherometer" exposure consisted of intermittently subjecting the specimens to the action of light having the same wave-lengths as those found in natural sunlight, but of increased intensity in the ultraviolet range, and regularly spraying water on the specimens to simulate the action of rain. The test involving seven-day exposure to ultraviolet light was carried out in a specially-constructed box fitted with high intensity ultraviolet fluorescent lamps, operated at a temperature of 100° F., and so placed that samples hung within the box were subjected to uniform exposure.

The controls and the exposed samples were tested to determine their stress-strain properties of tensile strength, elongation at break, and stiffness as indicated in the following tables. Tensile and elongation measurements were taken according to a modified version of ASTM D-412-41 after appropriate conditioning under controlled temperature and relative humidity. The modifications in the test procedure were relatively minor and not here material, since all comparisons were made among samples tested in an identical manner. A Scott tester (Model L-6 manufactured by Henry L. Scott and Co.) was used for the tensile and elongation determinations, operating at a draw-rate of 20 inches per minute. Stiffness tests, where made, utilized a non-ASTM procedure involving the application and release of a uniform bending stress to the specimen and determination of the deflection resulting. For the purpose of these evaluations, undesirable changes in the measured properties as the result of exposure to heat and light are manifested by a decrease in the tensile and elongation values, or by an increase in the stiffness value. The results of tests on each of the compositions described in Table I are set forth in the Tables II, III, IV, and V.

TABLE III

*Comparison of "Tri-Mal" stocks*

| Compound Number | 4 | 5 |
|---|---|---|
| Parts salicylalazine/100 chlorosulphonated polyethylene | 0 | 5 |
| Initial tensil, p. s. i | 2,480 | 1,720 |
| Initial elongation, percent | 595 | 620 |
| Initial stiffness, p. s. i | 264 | 436 |
| 7-days exposure in ultraviolet light box at 40° C.: | | |
| tensile, p. s. i | 2,215 | 1,900 |
| elongation, percent | 480 | 630 |
| stiffness, p. s. i | 849 | 579 |

TABLE IV

*Comparison of litharge stocks*

| Compound Number | 6 | 7 | 8 | 9 | 10 | 11 |
|---|---|---|---|---|---|---|
| Parts salicylalazine/100 chlorosulphonated polyethylene | 0 | 2 | 5 | 0 | 2 | 5 |
| Initial tensile, p. s. i | 2,590 | 2,325 | 2,155 | 2,170 | 2,280 | 2,000 |
| Initial elongation, percent | 425 | 590 | 600 | 370 | 530 | 540 |
| 7-days exposure in ultraviolet light box at 40° C.: | | | | | | |
| tensile, p. s. i | 2,620 | 2,370 | 2,245 | 2,090 | 2,110 | 1,930 |
| elongation, percent | 400 | 530 | 530 | 335 | 480 | 500 |
| Oven age 7 days at 125° C.: | | | | | | |
| tensile, p. s. i | 1,210 | 1,330 | 1,735 | 1,500 | 2,195 | 2,080 |
| elongation, percent | 180 | 240 | 300 | 200 | 300 | 300 |

TABLE V

*Comparison of stabilizers*

| Compound Number | Stabilizer per 100 parts chlorosulphonated polyethylene | Initial—Tensile/Elongation | After 7 days 125°C.—Tensile/Elongation |
|---|---|---|---|
| 6 | no stabilizer used | 2,590/425 | 1,210/180 |
| 7 | 2 parts salicylalazine | 2,325/590 | 1,330/240 |
| 8 | 5 parts salicylalazine | 2,155/600 | 1,735/300 |
| 12 | 5 parts dibasic lead phthalate | 2,545/400 | 1,270/120 |
| 13 | 5 parts barium ricinoleate | 2,345/375 | 1,000/80 |
| 14 | 5 parts cadmium stearate | 2,900/450 | 655/20 |
| 15 | 5 parts phenyl salicylate | 2,210/415 | 1,540/115 |

TABLE I

*Comparison of test stocks*

(Parts by weight)

| Compound Number | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Chlorosulphonated polyethylene | 100 | 100 | 100 | 100 | 100 | 100 | 100 | 100 | 100 | 100 | 100 | 100 | 100 | 100 | 100 |
| Hydrogenated Wood Rosin | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| 2-Mercaptobenzothiazole | 3 | 3 | 3 | 3 | 3 | 3 | 3 | 3 | 3 | 3 | 3 | 3 | 3 | 3 | 3 |
| Magnesia | 20 | 20 | 20 | | | | | | | | | | | | |
| Tribasic Lead Maleate | | | | 33 | 33 | | | | | | | | | | |
| Litharge | | | | | | 40 | 40 | 40 | 40 | 40 | 40 | 40 | 40 | 40 | 40 |
| Titanium Dioxide | | | | | | | | | 30.2 | 30.2 | 30.2 | | | | |
| Salicylalazine | | 5 | 10 | | 5 | | 2 | 5 | | 2 | 5 | | | | |
| Dibasic Lead Phthalate | | | | | | | | | | | | 5 | | | |
| Barium Ricinoleate | | | | | | | | | | | | | 5 | | |
| Cadmium Stearate | | | | | | | | | | | | | | 5 | |
| Phenyl Salicylate | | | | | | | | | | | | | | | 5 |

TABLE II

*Comparison of magnesia stocks*

| Compound Number | 1 | 2 | 3 |
|---|---|---|---|
| Parts salicylalazine/100 chlorosulphonated polyethylene | 0 | 5 | 10 |
| Initial tensile, p. s. i | 1,500 | 1,730 | 1,400 |
| Initial elongation, percent | 460 | 440 | 560 |
| Weatherometer exposure (500 hours): | | | |
| tensile, p. s. i | 910 | 1,830 | 1,430 |
| elongation, percent | 240 | 420 | 450 |
| Oven Aging (7 days 125° C.): | | | |
| tensile, p. s. i | 1,800 | 2,130 | 1,920 |
| elongation, percent | 175 | 220 | 230 |

The compositions tested include basic stocks vulcanized by each of the three curing agents normally used with chlorosulphonated polyethylene; namely, magnesia, litharge, and tribasic lead maleate. Although the stocks cured with different curing agents differ in stability toward heat and light, it will be observed that the addition of salicylalazine improves each stock in one or both respects.

Thus the magnesia stocks (Table II) containing salicylalazine retained their tensile strength and elongation markedly better than the control after the "Weatherometer" exposure. After oven aging the magnesia formulation containing 5 parts of salicylalazine (compound 2) likewise showed better values than the control. Comparison between compounds 1 and 3 is rendered more difficult inasmuch as it is apparent that the higher concentration of stabilizer has retarded the initial cure to some extent. Nevertheless, it is apparent that the stabilized sample showed better retention of tensile strength and elongation than did the control.

With the "Tri-Mal" stocks (Table II), the comparison is again less clear because the salicylalazine has retarded the initial cure. However, it is obvious that after exposure to light, the stabilized stock has increased in tensile strength and retained its elongation, while the control has deteriorated in both respects. Similarly, the control has stiffened much more than the stabilized material.

The litharge stocks (Tables IV and V) are inherently quite stable to the action of light, hence the effect of the added stabilizer is masked by the effect of the litharge in the light exposure comparison. Here the advantage of salicylalazine is shown most clearly in the heat-aging runs, where both the gum stocks and titania-filled stocks containing salicylalazine exhibited significantly higher tensile strength and elongation than did either the corresponding unstabilized controls or the materials stabilized with other candidate stabilizers.

While the examples and preceding discussion have been limited to consideration of chlorosulphonated polyethylene, similar results are obtained with chlorosulphonated polymethylene and chlorosulphonated interpolymers of ethylene and vinyl chloride and these materials may be considered equivalents of chlorosulphonated polyethylene for the practice of this invention.

It will be recognized that the mode of incorporating stabilizer described in the preceding examples, while preferable from the standpoint of convenience in evaluating candidate stabilizers, involves an additional compounding treatment which is desirably eliminated in the preparation of stocks for commercial use. Thus the preferable mode of addition in the latter case comprises adding the stabilizer during the compounding of the other ingredients of the recipe. Preferably the stabilizer is compounded prior to addition of the accelerator, either alone or premixed with one or more of the other ingredients.

The purity and state of subdivision of the salicylalazine is not a critical factor in the practice of the invention. Advantageously, however, the purity of the salicylalazine is such that in the dry state, the compound melts within about 3° C. of 213° C., and the material should be sufficiently fine to pass a 20-mesh screen.

Compounding on two-roll mills in which the rolls operate at different speeds has been found to be the most convenient means of effecting uniform distribution of the stabilizer. However, various other compounding techniques such as those conventional in rubber compounding, may be successfully employed.

The amount of stabilizer to be employed will depend largely on the specific use contemplated for the product. Lower amounts will cause less interference with curing time, or a smaller decrease in physical initial properties at standard curing time, but will afford a lower measure of stabilizing action. Depending on the intended application an amount within the range of from about 0.5 to 10 parts of salicylalazine per 100 parts by weight of the chlorosulphonated material, is preferable.

The stabilized products of this invention are especially valuable in applications involving continuous or periodic exposure to elevated temperatures, as for example vehicle tires, conveyor belting, shock mountings, spark plug covers, ignition wire covering, and the like. The stabilized products are also advantageously employed in elastomer-coated tarpaulins, weather-stripping, elastomer-based paints, outdoor garden or fire hose, etc., where especial advantage is due to the increased light stability.

As many variations of the present invention are possible, without departing from the teachings herein, it is petitioned that the invention be limited only as indicated in the following claims.

I claim:

1. A composition of matter comprising a chlorosulphonated polymer, having a molecular weight of not less than about 5000, and selected from the group consisting of chlorosulphonated polymethylene, chlorosulphonated polyethylene, and chlorosulphonated interpolymers of ethylene and vinyl chloride, in admixture with from about 0.5 to about 10 per cent, by weight of said chlorosulphonated polymer, of salicylalazine.

2. A stabilized composition of matter comprising a cured chlorosulphonated polymer of the group consisting of chlorosulphonated polymethylene, chlorosulphonated polyethylene, and chlorosulphonated interpolymers of ethylene and vinyl chloride, having a molecular weight of not less than about 5000, in admixture with from about 0.5 to about 10 percent, by weight of said polymer, of salicylalazine as a stabilizer therefor.

3. A composition of matter stabilized against the deteriorating action of heat and light comprising a cured, elastomeric, chlorosulphonated polymer of ethylene, in admixture with from about 0.5 to about 10 percent, by weight of said polymer, of salicylalazine as a stabilizer.

4. A process for stabilizing chlorosulphonated polymers selected from the group consisting of chlorosulphonated polymethylene, chlorosulphonated polyethylene, and chlorosulphonated interpolymer of ethylene and vinyl chloride which comprises adding and intimately admixing salicylalazine as a stabilizer, said polymer having a molecular weight of not less than about 5000, and said salicylalazine being added prior to final curing of said chlorosulphonated polymer, in an amount ranging from about 0.5 to about 10 percent by weight of said chlorosulphonated polymer, and curing the composition.

5. A process for stabilizing chlorosulphonated polyethylene which comprises adding and intimately admixing salicylalazine as a stabilizer, said salicylalazine being added prior to final curing of said chlorosulphonated polyethylene, in an amount ranging from about 0.5 to about 10 percent by weight of said chlorosulphonated polyethylene, and curing the composition.

No references cited.